(12) United States Patent
Zhou et al.

(10) Patent No.: US 10,565,442 B2
(45) Date of Patent: Feb. 18, 2020

(54) PICTURE RECOGNITION METHOD AND APPARATUS, COMPUTER DEVICE AND COMPUTER- READABLE MEDIUM

(71) Applicant: BAIDU ONLINE NETWORK TECHNOLOGY (BEIJING) CO., LTD., Beijing (CN)

(72) Inventors: Feng Zhou, Beijing (CN); Xiao Liu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 64 days.

(21) Appl. No.: 15/912,361

(22) Filed: Mar. 5, 2018

(65) Prior Publication Data
US 2018/0260621 A1 Sep. 13, 2018

(30) Foreign Application Priority Data
Mar. 10, 2017 (CN) .......................... 2017 1 0142614

(51) Int. Cl.
*G06K 9/00* (2006.01)
*G06K 9/62* (2006.01)
(Continued)

(52) U.S. Cl.
CPC ..... *G06K 9/00456* (2013.01); *G06K 9/00684* (2013.01); *G06K 9/4628* (2013.01);
(Continued)

(58) Field of Classification Search
CPC .......... G06K 9/00456; G06K 9/00684; G06K 9/4628; G06K 9/6256; G06K 9/627;
(Continued)

(56) References Cited

U.S. PATENT DOCUMENTS

2012/0039539 A1* 2/2012 Boiman ................. G11B 27/28
382/195
2016/0379091 A1* 12/2016 Lin ..................... G06K 9/00724
382/156
(Continued)

FOREIGN PATENT DOCUMENTS

CN 106022285 A 10/2016

OTHER PUBLICATIONS

First Office Action from CN app. No. 201710142614.7, dated Sep. 3, 2019, with machine English translation from Google Translate.
(Continued)

*Primary Examiner* — Jianxun Yang
(74) *Attorney, Agent, or Firm* — Ladas & Parry, LLP

(57) ABSTRACT

The present disclosure provides a picture recognition method and apparatus, a computer device and a computer-readable medium. The method comprises: obtaining a to-be-recognized picture; according to the to-be-recognized picture and a pre-trained picture recognition model, acquiring a predicted class tag of the to-be-recognized picture; the pre-trained picture recognition model employs a convolutional neural network model, and the convolutional neural network model comprises at least one layer of kernel pooling layer upgrading a dimensionality of a channel from one dimension to multiple dimensions; recognizing a class of the to-be-recognized picture according to the predicted class tag of the to-be-recognized picture. By recognizing the to-be-recognized picture by using the picture recognition model having the kernel pooling layer, the present disclosure can achieve recognition of picture classes with finer granularities and effectively improve the picture recognition accuracy and efficiency.

18 Claims, 3 Drawing Sheets

(51) Int. Cl.
  *G06K 9/66* (2006.01)
  *G06K 9/46* (2006.01)
(52) U.S. Cl.
  CPC ........... *G06K 9/627* (2013.01); *G06K 9/6256* (2013.01); *G06K 9/6273* (2013.01); *G06K 9/66* (2013.01)
(58) Field of Classification Search
  CPC .... G06K 9/6273; G06K 9/66; G06K 9/00724; G06K 9/6262; G06K 9/00275; G06K 9/00241; G11B 27/28; G11B 27/329
  See application file for complete search history.

(56) References Cited

U.S. PATENT DOCUMENTS

| | | | |
|---|---|---|---|
| 2017/0046563 A1* | 2/2017 | Kim | G06K 9/00275 |
| 2019/0180148 A1* | 6/2019 | Jiang | G06K 9/4628 |

OTHER PUBLICATIONS

"Research on Audio Feature Extraction and Context Recognition Based on Deep Neural Networks", Ha Bin Industrial University, Jun. 2015.

\* cited by examiner

PICTURE RECOGNITION METHOD AND APPARATUS, COMPUTER DEVICE AND COMPUTER-READABLE MEDIUM

The present application claims the priority of Chinese Patent Application No. 201710142614.7, filed on Mar. 10, 2017, with the title of "Picture recognition method and apparatus, computer device and computer-readable medium", the entire disclosure of which is hereby incorporated by reference in its entirety.

FIELD OF THE DISCLOSURE

The present disclosure relates to the technical field of computer disclosure, and particularly to a picture recognition method and apparatus, a computer device and a computer-readable medium.

BACKGROUND OF THE DISCLOSURE

In many disclosure scenarios, pictures need to be classified to facilitate classified management of pictures. When there are few pictures, the pictures may be classified manually. However, as network science and technology develops, tens of thousands of pictures usually need to be classified in a network scenario, and the manual processing manner becomes excessively impractical. Hence, how to smartly recognize pictures for classification becomes particularly important in the network scenario.

In the prior art, a convolutional neural network model may be used to recognize class of the pictures. A current convolutional neural network model comprises a convolutional operation and a pooling operation, wherein the pooling operation comprises average pooling, maximum pooling and bilinear pooling and the like. The average pooling operation means averaging a group of input feature vectors and then outputting the average. The maximum pooling means taking a maximum value from a group, of feature vectors and then outputting it. The bilinear pooling means enabling input feature vectors to perform a vector outer product for themselves to obtain a bilinear representation of original features and outputting it. The features obtained by the bilinear pooling exhibit a stronger representation performance and achieve an effect better than the average pooling and maximum pooling.

However, the three types of pooling operations in the current convolutional neural network model cannot enrich granularity of picture recognition. Therefore, using the convolutional neural network model in the prior art to recognize pictures causes a larger granularity and an undesirable accuracy of picture recognition.

SUMMARY OF THE DISCLOSURE

The present disclosure provides a picture recognition method and apparatus, a computer device and a computer-readable medium to improve the picture recognition accuracy in the prior art.

The present disclosure provides a picture recognition method, comprising:

obtaining a to-be-recognized picture;

according to the to-be-recognized picture and a pre-trained picture recognition model, acquiring a predicted class tag of the to-be-recognized picture; the pre-trained picture recognition model employs a convolutional neural network model, and the convolutional neural network model comprises at least one layer of kernel pooling layer upgrading a dimensionality of a channel from one dimension to multiple dimensions;

recognizing a class of the to-be-recognized picture according to the predicted class tag of the to-be-recognized picture.

Further optionally, in the above-mentioned method, before acquiring the predicted class tag of the to-be-recognized picture according to the to-be-recognized picture and the pre-trained picture recognition model, the method further comprises:

collecting several training pictures whose classes have already been determined, and generating a training picture database;

training the picture recognition model according to the several training pictures in the training picture database and classes of the training pictures.

Further optionally, in the above-mentioned method, the training the picture recognition model according to the several training pictures in the training picture database and classes of the training pictures specifically comprises:

inputting training pictures in the several training pictures in turn into the picture recognition model to acquire corresponding predicted class tags of respective training pictures;

generating real class tags of the training pictures according to classes of the training pictures;

generating a loss function of the training pictures according to the predicted class tags of the training pictures and the real class tags of the training pictures;

calculating derivatives of the loss function of the training pictures for parameters in the picture recognition model;

according to the parameters in the picture recognition model and the derivatives of the loss function of the training pictures for the parameters, updating the parameters in the picture recognition model to thereby determine the picture recognition model after the training this time;

repeatedly executing the above steps until the several training pictures all train the picture recognition model and determine the picture recognition model after this round of training.

Further optionally, in the above-mentioned method, the training the picture recognition model according to the several training pictures in the training picture database and classes of the training pictures specifically further comprises:

according to the training of the picture recognition model performed by the several training pictures in the training picture database in each round of training, using the several training pictures in the training picture database to repeatedly train the picture recognition model N rounds, to obtain a final picture recognition model.

Further optionally, in the above-mentioned method, the recognizing a class of the to-be-recognized picture according to the predicted class tag of the to-be-recognized picture specifically comprises:

obtaining a class with a maximum probability corresponding to the to-be-recognized picture, according to the predicted class tag of the to-be-recognized picture;

considering the class with the maximum probability corresponding to the to-be-recognized picture as the class of the to-be-recognized picture.

Further optionally, in the above-mentioned method, before acquiring a predicted class tag of the to-be-recognized picture according to the to-be-recognized picture and a pre-trained picture recognition model, the method further comprises:

obtaining the convolutional neural network model;

upgrading the dimensionality of a channel in at least one pooling layer in the convolutional neural network model from one dimension to multiple dimensions, to obtain the picture recognition model.

The present disclosure further provides a picture recognition apparatus, comprising:

an obtaining module configured to obtain a to-be-recognized picture;

a predicted class tag acquiring module configured to, according to the to-be-recognized picture and a pre-trained picture recognition model, acquire a predicted class tag of the to-be-recognized picture; the pre-trained picture recognition model employs a convolutional neural network model, and the convolutional neural network model comprises at least one layer of kernel pooling layer upgrading a dimensionality of a channel from one dimension to multiple dimensions;

a recognizing module configured to recognize a class of the to-be-recognized picture according to the predicted class tag of the to-be-recognized picture.

Further optionally, the above apparatus further comprises:

a collecting module configured to collect several training pictures whose classes have already been determined, and generate a training picture database;

a training module configured to train the picture recognition model according to several training pictures in the training picture database and classes of the training pictures.

Further optionally, in the above apparatus, the training module is specifically configured to:

input training pictures in the several training pictures in turn into the picture recognition model to acquire predicted class tags of respective training pictures;

generate real class tags of the training pictures according to classes of the training pictures;

generate a loss function of the training pictures according to the predicted class tags of the training pictures and the real class tags of the training pictures;

calculate derivatives of the loss function of the training pictures for parameters in the picture recognition model;

according to the parameters in the picture recognition model and the derivatives of the loss function of the training pictures for the parameters, update the parameters in the picture recognition model to thereby determine the picture recognition model after the training this time;

repeatedly executing the above steps until several training pictures all train the picture recognition model and determine the picture recognition model after this round of training.

Further optionally, in the above apparatus, the training module is further specifically configured to, according to the training of the picture recognition model performed by the several training pictures in the training picture database in each round of training, use the several training pictures in the training picture database to repeatedly train the picture recognition model N rounds, to obtain a final picture recognition model.

Further optionally, in the above apparatus, the recognizing module is configured to:

obtain a class with a maximum probability corresponding to the to-be-recognized picture, according to the predicted class tag of the to-be-recognized picture;

consider the class with the maximum probability corresponding to the to-be-recognized picture as the class of the to-be-recognized picture.

Further optionally, the above apparatus further comprises:

a model generating module configured to obtain the convolutional neural network model; upgrade the dimensionality of a channel in at least one pooling layer in the convolutional neural network model from one dimension to multiple dimensions, to obtain the picture recognition model.

The present disclosure further provides a computer device, comprising:

one or more processors;

a memory for storing one or more programs, when the one or more programs are executed by the one or more processors, the one or more processors are enabled to implement the aforesaid picture recognition method.

The present disclosure further provides a computer-readable medium on which a computer program is stored, the program, when executed by the processor, implementing the aforesaid picture recognition method.

According to the picture recognition method and apparatus, the computer device and the computer-readable medium of the present disclosure, it is feasible to obtain a to-be-recognized picture; according to the to-be-recognized picture and a pre-trained picture recognition model, acquire a predicted class tag of the to-be-recognized picture; wherein the pre-trained picture recognition model employs a convolutional neural network model, and the convolutional neural network model comprises at least one layer of kernel pooling layer upgrading a dimensionality of a channel from one dimension to multiple dimensions; recognize a class of the to-be-recognized picture according to the predicted class tag of the to-be-recognized picture. By recognizing the to-be-recognized picture by using the picture recognition model having the kernel pooling layer, the present disclosure can achieve recognition of picture classes with finer granularities and effectively improve the picture recognition accuracy and efficiency.

DETAILED DESCRIPTION OF PREFERRED EMBODIMENTS

The present disclosure will be described in detail in conjunction with figures and specific embodiments to make objectives, technical solutions and advantages of the present disclosure more apparent.

Figure 1:
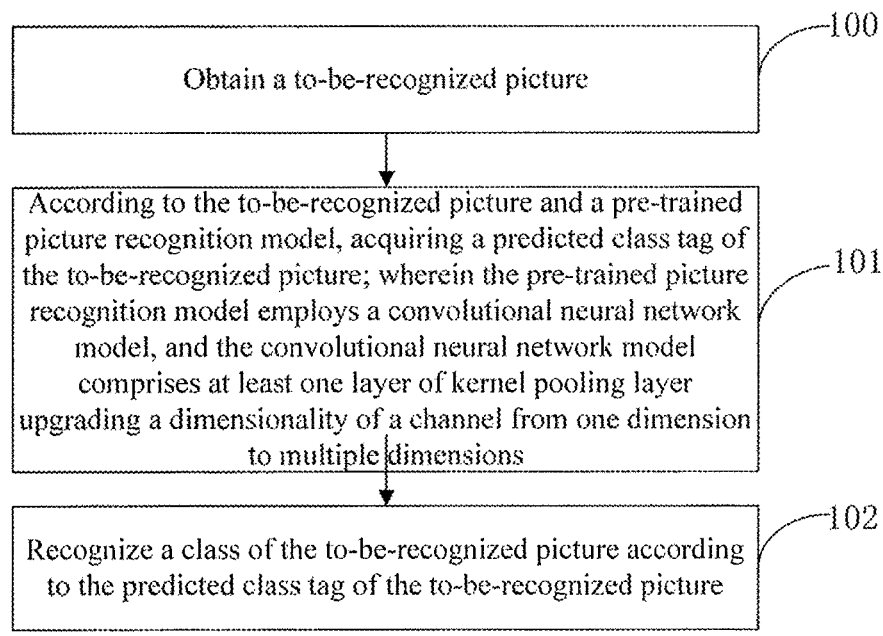
FIG. 1 is a flow chart of Embodiment 1 of a picture recognition method according to the present disclosure.

FIG. 1 is a flow chart of Embodiment 1 of a picture recognition method according to the present disclosure. As shown in FIG. 1, the picture recognition method according to the present embodiment may specifically comprise the following steps:

100: obtaining a to-be-recognized picture;

101: according to the to-be-recognized picture and a pre-trained picture recognition model, acquiring a predicted class tag of the to-be-recognized picture; wherein the pre-trained picture recognition model employs a convolutional neural network model, and the convolutional neural network model comprises at least one layer of kernel pooling layer upgrading a dimensionality of a channel from one dimension to multiple dimensions;

102: recognizing a class of the to-be-recognized picture according to the predicted class tag of the to-be-recognized picture.

A subject for executing the picture recognition method according to the present embodiment is a picture recognition apparatus which may be either an electronic device as an entity or a device integrated using software.

The picture recognition method according to the present embodiment is a picture recognition method based on a convolutional neural network model, namely, the picture recognition model according to the present embodiment specifically employs a convolutional neural network model. However, the picture recognition model according to the present embodiment is not an ordinary convolutional neural network model. The convolutional neural network model employed by the picture recognition model comprises at least one layer of kernel pooling layer upgrading a dimensionality of a channel from one dimension to multiple dimensions. Usually, the convolutional neural network model may comprise 2-6 layer of pooling layers and a plurality of convolution layers and the pooling layers are not located at a first layer of the convolutional neural network model, so the pooling operation in the convolutional neural network model is usually subsequent to the convolution operation and is a pooling operation for convolution features output by the convolution operation. The convolution features may be represented using a 3-dimensional matrix of length, width and channel. Usually, the pooling operation comprises average pooling, maximum pooling and bilinear pooling. None of the several types of pooling operations changes the dimensionality of the channel, so the current convolutional neural network model exhibits an undesirable representation performance and cannot perform classified recognition for the pictures with finer granularity. The procedure of upgrading the dimensionality of the channel in at least one pooling layer in the convolutional neural network from one dimension to multiple dimensions in the present embodiment is particularly a nuclear fusion procedure, so the pooling layer after the upgrading is called a kernel pooling layer. However, other layers in the convolutional neural network model may remain unchanged. Upon picture recognition, the kernel pooling layer increases the dimensionality of the channel and increases a workload of each layer following the kernel pooling layer in the convolutional neural network. Therefore, to save time spent by the picture recognition model in recognizing pictures and improve the picture recognition efficiency, when the picture recognition model only comprises a layer of kernel pooling layer, the kernel pooling layer may be provided at the last layer in the corresponding convolutional neural network model. The number of layers of the kernel pooling layers may be arranged according to needs in the present embodiment. The larger the number of layers is, a better representation performance is achieved by the generated picture recognition model, and finer classification granularity of picture recognition is achieved.

In the present embodiment, the predicted class tag of the to-be-recognized picture acquired according to the to-be-recognized picture and the pre-trained picture recognition model is a form of a vector, the number of dimensions of the vector represents the number of classes resulting from classification of the recognized pictures, and the number of dimensions of the vector may be determined when the picture recognition model is trained. That is to say, the picture recognition method of the present embodiment, upon performing recognition for the to-be-recognized pictures, can only support recognizing the to-be-recognized pictures into classes of pictures that can be recognized upon training. It is feasible, upon training, collect all pictures corresponding to classes of pictures that can be supported and have finer granularity, and train the picture recognition model. For example, upon training, predetermined classes of pictures that can be supported comprise 1000 classes, and the 1000 classes may comprise very fine picture classes. In this case, when to-be-recognized pictures are recognized using the picture recognition model, the predicted class tags output by the picture recognition model may be a vector of 1000 dimensions; the class of picture represented by each position in the vector is fixed, and a value of an element at each position represents a probability value that the to-be-recognized picture belongs to the class of picture corresponding to the position.

In the present embodiment, the more classes of pictures the picture recognition model can support, the richer dimensions of the predicted class tags are output when the picture recognition model recognizes pictures, thereby supporting recognition and classification of pictures of finer granularities. For example, it the convolutional neural network model in the prior art can only recognize pictures with dogs in the class of pictures with the animal dogs, the picture recognition model according to the present embodiment has richer representation performance as employing the kernel pooling layer and may be employed to implement classification of breeds of dogs in the pictures, for example, can recognize the class of a dog in a certain picture as a Tibetan Mastiff, a shepherd dog, a poodle or the like, thereby achieving recognition of picture classes with finer granularities.

According to the picture recognition method of the present embodiment, after acquiring the predicted class tag of the to-be-recognized picture according to the to-be-recognized picture and a pre-trained picture recognition model, it is possible to obtain a class of the to-be-recognized picture according to the predicted class tag of the to-be-recognized picture. For example, the step 102 "recognizing a class of the to-be-recognized picture according to the predicted class tag of the to-be-recognized picture" may specifically include the following steps:

(a1) obtaining a class with a maximum probability corresponding to the to-be-recognized picture, according to the predicted class tag of the to-be-recognized picture;

(a2) considering the class with the maximum probability corresponding to the to-be-recognized picture as the class of the to-be-recognized picture.

Since in the predicted class tag of the to-be-recognized picture output by the picture recognition model, a value of each element represents a probability that the to-be-recognized picture belongs to the class of picture corresponding to the position, it is feasible to obtaining a class with a maximum probability corresponding to the to-be-recognized picture from the predicted class tag, to consider the class with the maximum probability as the class of the to-be-recognized picture, and thereby to classify pictures according to the classes of recognized pictures.

Further optionally, the procedure of generating the picture recognition model in the present embodiment may specifically comprise the following steps:

(b1) obtaining the convolutional neural network model;

(b2) upgrading the dimensionality of the channel in at least one pooling layer in the convolutional neural network model from one dimension to multiple dimensions, to obtain the picture recognition model.

First, it is feasible to first obtain an ordinary convolutional neural network model, and then upgrade the dimensionality of the channel in at least one pooling layer in the convolutional neural network model from one dimension to multiple dimensions, to obtain the picture recognition model. In the present embodiment, the method of upgrading the dimensionality of the channel of the pooling layer from one dimension to multiple dimensions may specifically be implemented in a manner of performing the vector outer product; or it is also possible to employ other methods that can implement upgrading the dimensionality of the channel of the pooling layer from one dimension to multiple dimensions; or the kernel pooling layer of the present embodiment may also represent the input features of the kernel pooling layer as a polynomial combination of original feature vectors, to enrich channel dimensionality and use fast Fourier transform to represent output features in a compressed manner and output them; as such, the obtained output features include combined information of original features in higher dimensionality, so that the picture recognition model of the present embodiment has richer representation performance and can achieve recognition of picture classes with finer granularities and improve the picture recognition accuracy and efficiency.

According to the picture recognition method of the present embodiment, it is feasible to obtain a to-be-recognized picture; according to the to-be-recognized picture and a pre-trained picture recognition model, acquire a predicted class tag of the to-be-recognized picture; wherein the pre-trained picture recognition model employs a convolutional neural network model, and the convolutional neural network model comprises at least one layer of kernel pooling layer upgrading a dimensionality of a channel from one dimension to multiple dimensions; recognize a class of the to-be-recognized picture according to the predicted class tag of the to-be-recognized picture. Recognizing the to-be-recognized picture by using the picture recognition model having the kernel pooling layer in the present embodiment can achieve recognition of picture classes with finer granularities and effectively improve the picture recognition accuracy and efficiency.

Figure 2:
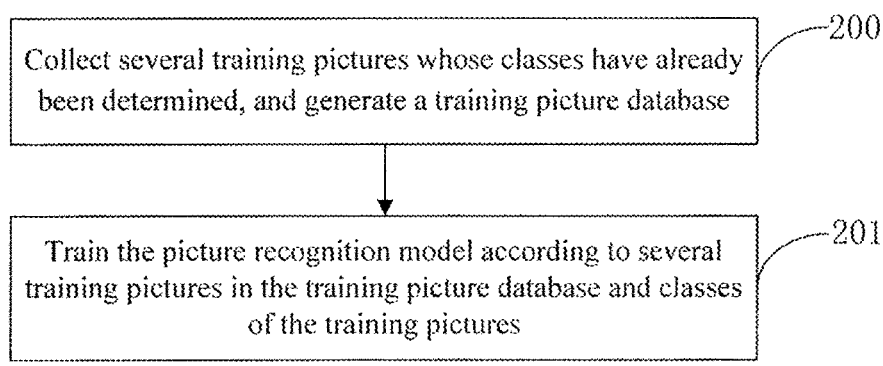
FIG. 2 is a flow chart of Embodiment 2 of a picture recognition method according to the present disclosure.

FIG. 2 is a flow chart of Embodiment 2 of a picture recognition method according to the present disclosure. As shown in FIG. 2, the picture recognition method according to the present embodiment, on the basis of the technical solution of the embodiment shown in FIG. 1, may further comprise the following steps before the step 101 "according to the to-be-recognized picture and a pre-trained picture recognition model, acquiring a predicted class tag of the to-be-recognized picture":

200: collecting several training pictures whose classes have already been determined, and generating a training picture database;

201: training the picture recognition model according to several training pictures in the training picture database and classes of the training pictures.

The steps 200-201 of the present embodiment are used to train the picture recognition model. When the picture recognition model is trained in the present embodiment, first, several training pictures are collected, and the training picture database is generated to train the picture recognition model. The more classes of pictures the training picture database of the present embodiment includes, the more classes of pictures can be supported and recognized when the to-be-recognized pictures are recognized subsequently. Furthermore, the picture recognition model in the present embodiment, as having the kernel pooling layer, may support recognition of pictures in pictures classes with fine granularities. Therefore, upon training, the pictures in pictures classes with fine granularities may be employed to train the picture recognition mode.

If the training picture database of the present embodiment includes more training pictures, parameters of the trained picture recognition model are more accurate, the predicted class tags subsequently acquired according to the picture recognition model are more accurate, and the picture recognition efficiency is higher. For example, the training picture database of the present embodiment may include 200,000-300,000 even more training pictures.

For example, in the present embodiment, the step 201 "training the picture recognition model according to several training pictures in the training picture database and classes of the training pictures" may specifically comprise the following steps:

(c1) inputting training pictures in the several training pictures in the training picture database in turn into the picture recognition model to acquire predicted class tags of respective training pictures;

In the present embodiment, during training of the picture recognition model, parameters in the picture recognition model change constantly, namely, the picture recognition model changes constantly. Upon training each time, the employed picture recognition model is an updated picture recognition model after training last time. When the picture recognition model according to the present embodiment is used initially, parameters employ preset initial values. The dimensionality of the predicted class tags is determined upon training, for example, if the several training pictures in the training picture database include pictures of a total of 999 classes, the dimensionality of the predicted class tags output by the picture recognition model may be set as 999.

(c2) generating real class tags of the training pictures according to classes of the training pictures.

Since the classes of the training pictures are already known, real class tags of the classes of the training pictures may be generated according to the classes of the training pictures. Likewise, the real class tags of the training pictures are also in a vector form. In the vector, a value of an element at a position corresponding to the class of the training picture is 1, and the values at remaining positions are 0.

(c3) generating a loss function of the training pictures according to the predicted class tags of the training pictures and the real class tags of the training pictures;

It is feasible to, according to the predicted class tags of the training pictures acquired in (c1) and the real class tags of the training pictures obtained in (c2), know a difference between the predicted class tags of the training pictures and the real class tags of the training pictures, and generate a loss function of the training pictures according to the difference. During the training of the picture recognition model in the present embodiment, a value of the loss function is gradually reduced to make the trained picture recognition model more accurate.

(c4) calculating derivatives of the loss function of the training pictures for parameters in the picture recognition model;

(c5) according to the parameters in the picture recognition model and the derivatives of the loss function of the training pictures for the parameters, updating the parameters in the picture recognition model to thereby determine the picture recognition model after the training this time;

(c6) repeatedly executing the above steps (c1)-(c5) until several training pictures all train the picture recognition model and determine the picture recognition model after this round of training.

Specifically, since the picture recognition model includes a plurality of parameters, when the input training picture is certain, the loss function may also be considered as a function about the parameters in the picture recognition model, whereupon it is feasible to calculate derivatives of the loss function of the training pictures for the parameters in the picture recognition model; when each parameter in the picture recognition model is updated, the parameter in the picture recognition model may be updated as the parameter subtracting the derivative of the loss function for the parameter, i.e., training each time updates the picture recognition model. After the picture recognition model is updated, the flow returns to step (c1) to begin to use next training picture to train the picture recognition model until step (c5) which completes the training of the picture recognition model by the next training picture, and again updates the parameters in the picture recognition model, thereby updating the picture recognition model; the flow is performed so on so forth until the several training pictures in the training picture database all train the picture recognition model and determine the picture recognition model after this round of training. The picture recognition model obtained at this time may also be applied to recognition of pictures.

Since what is characterized by the loss function is a value falling towards a gradient direction, a larger value of the loss function indicates a more inaccurate predicted class tag output by the picture recognition model after performing processing for the input picture. By adjusting the loss function constantly, the present embodiment makes the gradient of an ultimate point of the loss function be 0. A smaller value of the loss function indicates a more accurate processing result of the picture recognition model. According to the technical solution of the above embodiment, when the picture recognition model is updated, the updating is specifically performed in a gradually descending manner towards the loss function. Therefore, after constant training, constant optimization of the loss function and constant update of parameters of the picture recognition model and thereby constant update of the picture recognition model, a finally-obtained picture recognition model can very accurately process the picture and acquire more accurate predicted class tag.

Further optionally, it is further possible to, according to the training of the picture recognition model performed by the several training pictures in the training picture database in each round of training shown in the above steps (c1)-(c6), use the several training pictures in the training picture database to repeatedly train the picture recognition model N rounds, to obtain a final picture recognition model. For example, when the training picture database includes 200,000 training pictures, after the 200,000 training pictures in the training picture database are used in turn to train the picture recognition model, it can be believed that one round of training of the picture recognition model is completed; then the 200,000 training pictures in the training picture database are used again according to each round of training of the picture recognition model to train the picture recognition model N−1 rounds to obtain a final picture recognition model. In the present embodiment, multiple rounds of training may further improve the accuracy of the predicted class tags output when the trained picture recognition model recognizes the pictures, and thereby further improve the efficiency of performing picture recognition based on the picture recognition model. N in the present embodiment may take a positive integer according to practical experience, for example, the N may be a positive integer such as 5, 6 or 8, 10.

According to the picture recognition method of the present disclosure, the above picture recognition model having the kernel pooling layer, when used to recognize the to-be-recognized picture, can achieve recognition of picture classes with finer granularities and effectively improve the picture recognition accuracy and efficiency.

Figure 3:
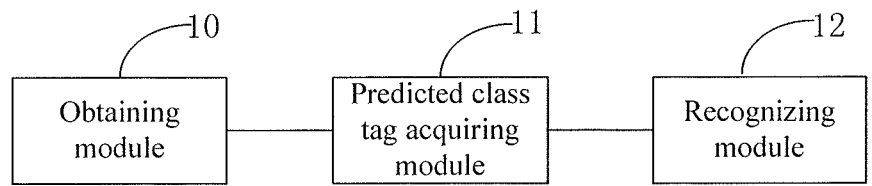
FIG. 3 is a structural diagram of Embodiment 1 of a picture recognition apparatus according to the present disclosure.

FIG. 3 is a structural diagram of Embodiment 1 of a picture recognition apparatus according to the present disclosure. As shown in FIG. 3, the picture recognition apparatus according to the present embodiment specifically comprises: an obtaining module 10, a predicted class tag acquiring module 11 and a recognizing module 12.

Wherein the obtaining module 10 is configured to obtain a to-be-recognized picture.

The predicted class tag acquiring module 11 is configured to, according to the to-be-recognized picture obtained by the obtaining module 10 and a pre-trained picture recognition model, acquire a predicted class tag of the to-be-recognized picture; the pre-trained picture recognition model employs a convolutional neural network model, and the convolutional neural network model comprises at least one layer of kernel pooling layer upgrading a dimensionality of a channel from one dimension to multiple dimensions;

The recognizing module 12 is configured to recognize a class of the to-be-recognized picture according to the predicted class tag of the to-be-recognized picture acquired by the predicted class tag acquiring module 11.

The picture recognition apparatus according to the present embodiment, by using the above modules, implements picture recognition with the same principle and technical effect as the above related method embodiments. Reference may be made to the above depictions of related method embodiments for details, which will not be provided any more here.

Figure 4:
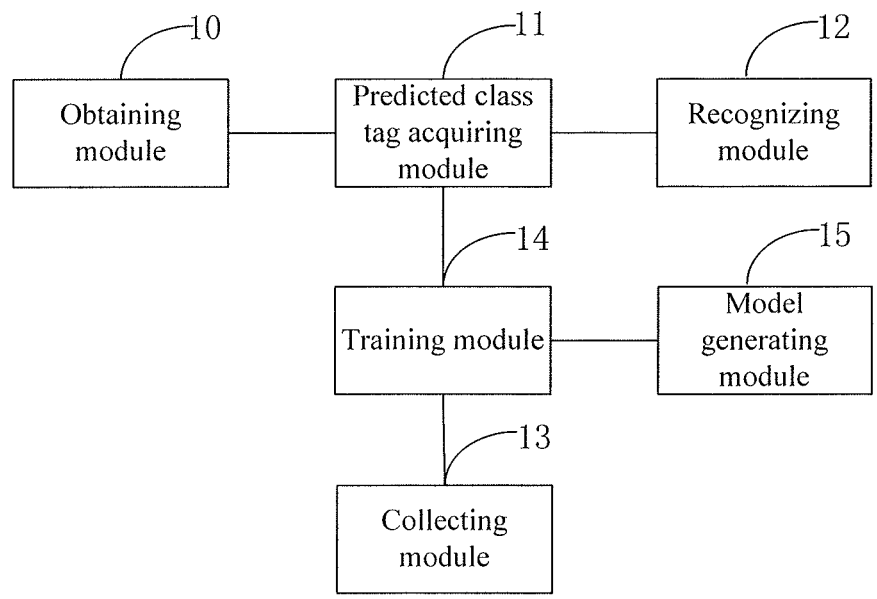
FIG. 4 is a structural diagram of Embodiment 2 of a picture recognition apparatus according to the present disclosure.

FIG. 4 is a structural diagram of Embodiment 2 of a picture recognition apparatus according to the present disclosure. As shown in FIG. 4, the picture recognition apparatus according to the present embodiment, on the basis of the technical solution of the embodiment shown in FIG. 3, further introduces the technical solution of the present disclosure in more detail.

As shown in FIG. 4, the picture recognition apparatus according to the present embodiment further comprises: a collecting module 13 and a training module 14.

The collecting module 13 is configured to collect several training pictures whose classes have already been determined, and generate a training picture database;

The training module 14 is configured to train the picture recognition model according to several training pictures in the training picture database and classes of the training pictures.

Correspondingly, the predicted class tag acquiring module 11 is configured to, according to the to-be-recognized picture obtained by the obtaining module 10 and the picture recognition model pre-trained by the training model 14, acquire a predicted class tag of the to-be-recognized picture.

Further optionally, in the picture recognition apparatus according to the present embodiment, the training module 14 is specifically configured to:

input training pictures in the several training pictures in the training picture database collected by the collecting module 13 in turn into the picture recognition model to acquire predicted class tags of respective training pictures;

generate real class tags of the training pictures according to classes of the training pictures;

generate a loss function of the training pictures according to the predicted class tags of the training pictures and the real class tags of the training pictures;

calculate derivatives of the loss function of the training pictures for parameters in the picture recognition model;

according to the parameters in the picture recognition model and the derivatives of the loss function of the training pictures for the parameters, update the parameters in the picture recognition model to thereby determine the picture recognition model after the training this time;

repeatedly executing the above steps until several training pictures all train the picture recognition model and determine the picture recognition model after this round of training.

Further optionally, in the picture recognition apparatus of the present embodiment, the training module 14 is further specifically configured to, according to the training of the picture recognition model performed by the several training pictures in the training picture database in each round of training, use the several training pictures in the training picture database to repeatedly train the picture recognition model N rounds, to obtain a final picture recognition model.

Further optionally, in the picture recognition apparatus according to the present embodiment, the recognizing module 12 is configured to:

obtain a class with a maximum probability corresponding to the to-be-recognized picture, according to the predicted class tag of the to-be-recognized picture acquired by the predicted class tag acquiring module 11;

consider the class with the maximum probability corresponding to the to-be-recognized picture as the class of the to-be-recognized picture.

Further optionally, as shown in FIG. 4, the picture recognition apparatus of the present embodiment further comprises:

a model generating module 15 configured to obtain a convolutional neural network model; upgrade the dimensionality of a channel in at least one pooling layer in the convolutional neural network model from one dimension to multiple dimensions, to obtain the picture recognition model.

Correspondingly, the training module 14 is configured to train the picture recognition model generated by the model generating module 15 according to several training pictures in the training picture database and classes of the training pictures.

The picture recognition apparatus according to the present embodiment, by using the above modules, implements picture recognition with the same principle and technical effect as the above related method embodiments. Reference may be made to the above depictions of related method embodiments for details, which will not be provided any more here.

Figure 5:
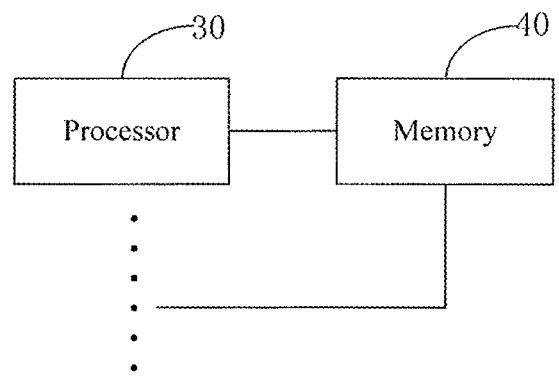
FIG. 5 is a structural diagram of an embodiment of a computer device according to the present disclosure.

FIG. 5 is a structural diagram of an embodiment of a computer device according to the present disclosure. As shown in FIG. 5, the computer device of the present embodiment comprises: one or more processors 30, and a memory 40, wherein the memory 40 is used to store one or more programs, and wherein when the one or more programs stored in the memory 40 are executed by the one or more processors 30, the one or more processors 30 are enabled to implement the picture recognition method of embodiments shown in FIG. 1-FIG. 4. The embodiment shown in FIG. 5 takes an example of the computer device comprising a plurality of processors 30.

Figure 6:
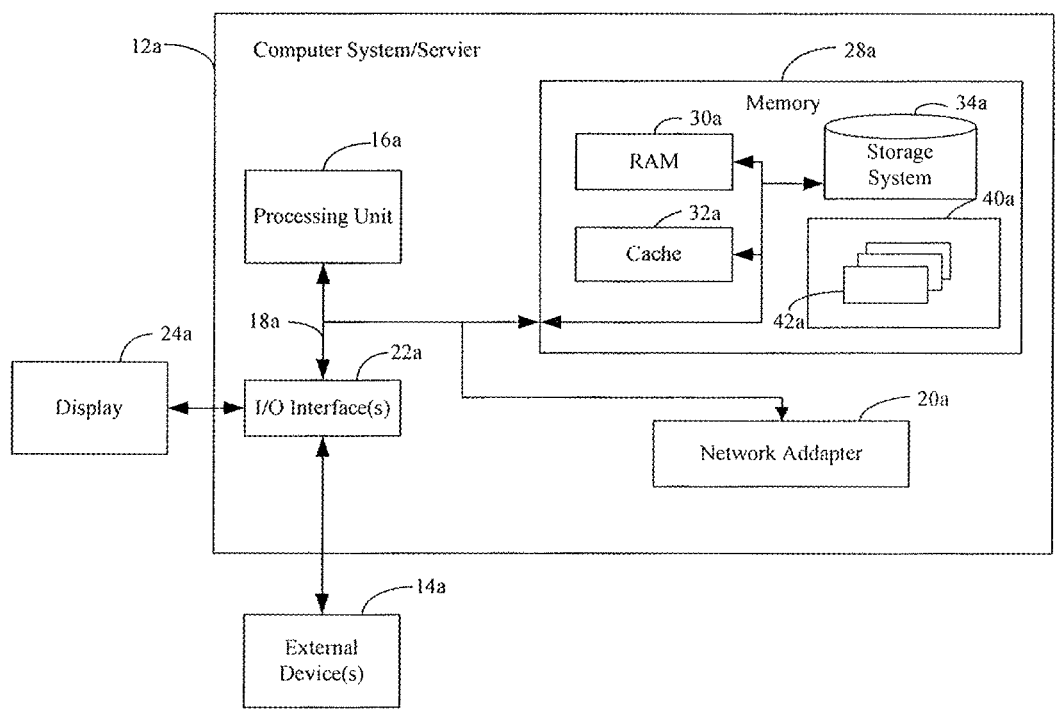
FIG. 6 is an example diagram of a computer device according to the present disclosure.

For example, FIG. 6 is an example diagram of a computer device according to the present disclosure. FIG. 6 shows a block diagram of an exemplary computer device 12a adapted to implement the embodiment of the present disclosure. The computer device 12a shown in FIG. 6 is only an example and should not bring about any limitation to the function and scope of use of the embodiments of the present disclosure.

As shown in FIG. 6, the computer device 12a is shown in the form of a general-purpose computing device. The components of computer device 12a may include, but are not limited to, one or more processors 16a, a system memory 28a, and a bus 18a that couples various system components including system memory 28a and the processor 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

System memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 6 and typically called a "hard drive"). Although not shown in FIG. 6, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The memory 28a may include at least one program product having a set (e.g., at least one) of program modules that are configured to carry out the functions of embodiments of the present disclosure shown in FIG. 1-FIG. 2.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments of the present disclosure as described with reference to FIG. 1-FIG. 2.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted, network adapter 20a communicates with the other modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function disclosures and data processing by running programs stored in the system memory 28a, for example, implement the picture recognition method as shown in the embodiments.

The present disclosure further provides a computer-readable storage medium on which a computer program is stored. The program, when executed by a processor, can implement the picture recognition method shown in the above embodiments.

The computer-readable medium of the present embodiment may include the RAM 30a, and/or cache memory 32a, and/or storage system 34a in the system memory 28a in the embodiment shown in FIG. 6.

Along with science and technological development, a propagation channel of the computer program is no longer limited to a tangible medium, and it may be downloaded directly from the network, or obtained in other manners. Therefore, the computer-readable medium in the present embodiment may comprise a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A picture recognition method, wherein the method comprises:
obtaining a to-be-recognized picture;
according to the to-be-recognized picture and a pre-trained picture recognition model, acquiring a predicted class tag of the to-be-recognized picture; the pre-trained picture recognition model employs a convolutional neural network model, and the convolutional neural network model comprises at least one layer of kernel pooling layer upgrading a dimensionality of a channel from one dimension to multiple dimensions;

recognizing a class of the to-be-recognized picture according to the predicted class tag of the to-be-recognized picture;

wherein an input feature of the at least one layer of kernel pooling layer is represented as a polynomial combination of original feature vectors to enrich channel dimensionality, and a fast Fourier transform is used to represent output features in a compressed manner.

2. The method according to claim 1, wherein, before acquiring the predicted class tag of the to-be-recognized picture according to the to-be-recognized picture and the pre-trained picture recognition model, the method further comprises:

collecting several training pictures whose classes have already been determined, and generating a training picture database;

training the picture recognition model according to the several training pictures in the training picture database and classes of the training pictures.

3. The method according to claim 2, wherein the training the picture recognition model according to the several training pictures in the training picture database and classes of the training pictures specifically comprises:

inputting training pictures in the several training pictures in turn into the picture recognition model to acquire corresponding predicted class tags of the training pictures;

generating real class tags of the training pictures according to classes of the training pictures;

generating a loss function of the training pictures according to the predicted class tags of the training pictures and the real class tags of the training pictures;

calculating derivatives of the loss function of the training pictures for parameters in the picture recognition model;

according to the parameters in the picture recognition model and the derivatives of the loss function of the training pictures for the parameters, updating the parameters in the picture recognition model to thereby determine the picture recognition model after the training this time;

repeatedly executing the above steps until the several training pictures all train the picture recognition model and determining the picture recognition model after this round of training.

4. The method according to claim 3, wherein the training the picture recognition model according to the several training pictures in the training picture database and classes of the training pictures specifically further comprises:

according to the training of the picture recognition model performed by the several training pictures in the training picture database in each round of training, using the several training pictures in the training picture database to repeatedly train the picture recognition model N rounds, to obtain a final picture recognition model.

5. The method according to claim 1, wherein the recognizing a class of the to-be-recognized picture according to the predicted class tag of the to-be-recognized picture specifically comprises:

obtaining a class with a maximum probability corresponding to the to-be-recognized picture, according to the predicted class tag of the to-be-recognized picture;

considering the class with the maximum probability corresponding to the to-be-recognized picture as the class of the to-be-recognized picture.

6. The method according to claim 1, wherein before acquiring a predicted class tag of the to-be-recognized picture according to the to-be-recognized picture and a pre-trained picture recognition model, the method further comprises:

obtaining the convolutional neural network model;

upgrading the dimensionality of a channel in at least one pooling layer in the convolutional neural network model from one dimension to multiple dimensions, to obtain the picture recognition model.

7. A computer device, wherein the computer device comprises:

one or more processors:

a memory for storing one or more programs, when the one or more programs are executed by the one or more processors, the one or more processors are enabled to implement the following operations:

obtaining a to-be-recognized picture;

according to the to-be-recognized picture and a pre-trained picture recognition model, acquiring a predicted class tag of the to-be-recognized picture; the pre-trained picture recognition model employs a convolutional neural network model, and the convolutional neural network model comprises at least one layer of kernel pooling layer upgrading a dimensionality of a channel from one dimension to multiple dimensions;

recognizing a class of the to-be-recognized picture according to the predicted class tag of the to-be-recognized picture;

wherein an input feature of the at least one layer of kernel pooling layer is represented as a polynomial combination of original feature vectors to enrich channel dimensionality, and a fast Fourier transform is used to represent output features in a compressed manner.

8. The computer device according to claim 7, wherein before acquiring the predicted class tag of the to-be-recognized picture according to the to-be-recognized picture and the pre-trained picture recognition model, the operation further comprises:

collecting several training pictures whose classes have already been determined, and generating a training picture database;

training the picture recognition model according to the several training pictures in the training picture database and classes of the training pictures.

9. The computer device according to claim 8, wherein the training the picture recognition model according to the several training pictures in the training picture database and classes of the training pictures specifically comprises:

inputting training pictures in the several training pictures in turn into the picture recognition model to acquire corresponding predicted class tags of the training pictures;

generating real class tags of the training pictures according to classes of the training pictures;

generating a loss function of the training pictures according to the predicted class tags of the training pictures and the real class tags of the training pictures;

calculating derivatives of the loss function of the training pictures for parameters in the picture recognition model;

according to the parameters in the picture recognition model and the derivatives of the loss function of the training pictures for the parameters, updating the parameters in the picture recognition model to thereby determine the picture recognition model after the training this time;

repeatedly executing the above steps until the several training pictures all train the picture recognition model and determining the picture recognition model after this round of training.

10. The computer device according to claim 9, wherein the training the picture recognition model according to the several training pictures in the training picture database and classes of the training pictures specifically further comprises:

according to the training of the picture recognition model performed by the several training pictures in the training picture database in each round of training, using the several training pictures in the training picture database to repeatedly train the picture recognition model N rounds, to obtain a final picture recognition model.

11. The computer device according to claim 7, wherein the recognizing a class of the to-be-recognized picture according to the predicted class tag of the to-be-recognized picture specifically comprises:

obtaining a class with a maximum probability corresponding to the to-be-recognized picture, according to the predicted class tag of the to-be-recognized picture;

considering the class with the maximum probability corresponding to the to-be-recognized picture as the class of the to-be-recognized picture.

12. The computer device according to claim 7, wherein before acquiring a predicted class tag of the to-be-recognized picture according to the to-be-recognized picture and a pre-trained picture recognition model, the operations further comprise:

obtaining the convolutional neural network model;

upgrading the dimensionality of a channel in at least one pooling layer in the convolutional neural network model from one dimension to multiple dimensions, to obtain the picture recognition model.

13. A non-transitory computer-readable medium on which a computer program is stored, wherein the program, when executed by the processor, implements the following operations:

obtaining a to-be-recognized picture;

according to the to-be-recognized picture and a pre-trained picture recognition model, acquiring a predicted class tag of the to-be-recognized picture; the pre-trained picture recognition model employs a convolutional neural network model, and the convolutional neural network model comprises at least one layer of kernel pooling layer upgrading a dimensionality of a channel from one dimension to multiple dimensions;

recognizing a class of the to-be-recognized picture according to the predicted class tag of the to-be-recognized picture;

wherein an input feature of the at least one layer of kernel pooling layer is represented as a polynomial combination of original feature vectors to enrich channel dimensionality, and a fast Fourier transform is used to represent output features in a compressed manner.

14. The non-transitory computer-readable medium according to claim 4, wherein before acquiring the predicted class tag of the to-be-recognized picture according to the to-be-recognized picture and the pre-trained picture recognition model, the operations further comprise:

collecting several training pictures whose classes have already been determined, and generating a training picture database;

training the picture recognition model according to the several training pictures in the training picture database and classes of the training pictures.

15. The non-transitory computer-readable medium according to claim 14, wherein the training the picture recognition model according to the several training pictures in the training picture database and classes of the training pictures specifically comprises:

inputting training pictures in the several training pictures in turn into the picture recognition model to acquire corresponding predicted class tags of the training pictures;

generating real class tags of the training pictures according to classes of the training pictures;

generating a loss function of the training pictures according to the predicted class tags of the training pictures and the real class tags of the training pictures;

calculating derivatives of the loss function of the training pictures for parameters in the picture recognition model;

according to the parameters in the picture recognition model and the derivatives of the loss function of the training pictures for the parameters, updating the parameters in the picture recognition model to thereby determine the picture recognition model after the training this time;

repeatedly executing the above steps until the several training pictures all train the picture recognition model and determining the picture recognition model after this round of training.

16. The non-transitory computer-readable medium according to claim 15, wherein the training the picture recognition model according to the several training pictures in the training picture database and classes of the training pictures specifically further comprises:

according to the training of the picture recognition model performed by the several training pictures in the training picture database in each round of training, using the several training pictures in the training picture database to repeatedly train the picture recognition model N rounds, to obtain a final picture recognition model.

17. The non-transitory computer-readable medium according to claim 13, wherein the recognizing a class of the to-be-recognized picture according to the predicted class tag of the to-be-recognized picture specifically comprises:

obtaining a class with a maximum probability corresponding to the to-be-recognized picture, according to the predicted class tag of the to-be-recognized picture;

considering the class with the maximum probability corresponding to the to-be-recognized picture as the class of the to-be-recognized picture.

18. The non-transitory computer-readable medium according to claim 13, wherein before acquiring a predicted class tag of the to-be-recognized picture according to the to-be-recognized picture and a pre-trained picture recognition model, the operation further comprises:

obtaining the convolutional neural network model;

upgrading the dimensionality of a channel in at least one pooling layer in the convolutional neural network model from one dimension to multiple dimensions, to obtain the picture recognition model.

* * * * *